(12) United States Patent
You et al.

(10) Patent No.: US 9,081,224 B2
(45) Date of Patent: Jul. 14, 2015

(54) TRANSFLECTIVE LIQUID CRYSTAL DISPLAY PANEL AND LIQUID CRYSTAL DISPLAY

(71) Applicant: BOE TECHNOLOGY GROUP CO., LTD., Beijing (CN)

(72) Inventors: Jaegeon You, Beijing (CN); Guangkui Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 66 days.

(21) Appl. No.: 13/703,648

(22) PCT Filed: Oct. 19, 2012

(86) PCT No.: PCT/CN2012/083173
§ 371 (c)(1),
(2) Date: Dec. 12, 2012

(87) PCT Pub. No.: WO2013/056663
PCT Pub. Date: Apr. 25, 2013

(65) Prior Publication Data
US 2014/0049716 A1    Feb. 20, 2014

(30) Foreign Application Priority Data
Oct. 21, 2011    (CN) .......................... 2011 1 0322762

(51) Int. Cl.
*G02F 1/1335*    (2006.01)
(52) U.S. Cl.
CPC .... *G02F 1/133512* (2013.01); *G02F 1/133555* (2013.01)

(58) Field of Classification Search
CPC .................. G02F 1/133555; G02F 1/133512
USPC ......................................................... 349/114
See application file for complete search history.

(56) References Cited

U.S. PATENT DOCUMENTS

| 6,482,479 | B1 * | 11/2002 | Dubal et al. ................... 428/1.1 |
| 6,710,827 | B2 * | 3/2004 | Kubo et al. ...................... 349/55 |
| 2003/0076463 | A1 | 4/2003 | Ozawa et al. | |
| 2003/0076464 | A1 | 4/2003 | Ozawa et al. | |
| 2003/0081159 | A1 | 5/2003 | Ha et al. | |

(Continued)

FOREIGN PATENT DOCUMENTS

| CN | 1410812 A | 4/2003 |
| CN | 1410811 A | 5/2003 |

(Continued)

OTHER PUBLICATIONS

First Chinese Office Action dated Mar. 5, 2014; Appln. No. 201110322762.X.

(Continued)

*Primary Examiner* — Lucy Chien
(74) *Attorney, Agent, or Firm* — Ladas & Parry LLP

(57) ABSTRACT

Embodiments of the present invention provide a transflective liquid crystal display (LCD) panel and a display having the same. The transflective liquid crystal display panel comprises a plurality of pixels, each pixel including a reflective region, a transmissive region, and a transition region located between the reflective region and the transmissive region. A light shielding layer is provided in at least a part of the plurality of the pixels, and the light shielding layer is provided at a position corresponding to the transition region.

9 Claims, 3 Drawing Sheets

(56) References Cited

U.S. PATENT DOCUMENTS

| | | |
|---|---|---|
| 2007/0195216 A1* | 8/2007 | Seong et al. ............... 349/44 |
| 2009/0073359 A1* | 3/2009 | Sonoda et al. ............. 349/113 |
| 2009/0122211 A1 | 5/2009 | Mori et al. |
| 2009/0135354 A1 | 5/2009 | Mitsui |
| 2009/0237600 A1 | 9/2009 | Nagai et al. |

FOREIGN PATENT DOCUMENTS

| | | |
|---|---|---|
| CN | 1417622 A | 5/2003 |
| CN | 1651983 A | 8/2005 |
| CN | 101430450 A | 5/2009 |
| CN | 101539680 A | 9/2009 |
| CN | 102645784 A | 8/2012 |
| JP | 2007-071938 A | 3/2007 |
| JP | 2008-015228 A | 1/2008 |

OTHER PUBLICATIONS

International Preliminary Report on Patentability dated Apr. 22, 2014; PCT/CN2012/083173.

International Search Report mailed Feb. 7, 2013; PCT/CN2012/083173.

Second Chinese Office Action Appln. No. 201110322762.X; Dated Sep. 24, 2014.

* cited by examiner

TRANSFLECTIVE LIQUID CRYSTAL DISPLAY PANEL AND LIQUID CRYSTAL
DISPLAY

TECHNICAL FIELD

Embodiments of the present invention relate to a transflective liquid crystal display (LCD) panel and a display having the same.

BACKGROUND

Transflective LCDs have the advantages of low power consumption and strong adaptability to ambient light, are currently the common technique for flat panel display, and are broadly applied to mobile display devices such as mobile phones, PDAs or the like. Since a transflective LCD can separately or concurrently employ a transmissive mode and a reflective mode to display images, the transflective LCD can be used in any ambient light. The basic structure of the transflective LCD is that each pixel is divided into two portions including a transmissive region and a reflective region, allowing the liquid crystals in the transmissive region to operate in the transmissive mode, and the liquid crystals in the reflective region to operate in the reflective mode. When the ambient light is darker, a backlight source is opened, the light is transmitted through the transmissive region, and the display operates in the transmissive mode, whereas when the ambient light is brighter than the backlight source, the display operates in the reflective mode, using the reflection of surrounding lights to displayed image. In each pixel of the transflective LCD, typically the transmissive region and the reflective region have different cell gaps so as to compensate the difference between optical lengths.

However, in the display of a transflective mode, because the different cell gaps are between the reflective region and the transmissive region of each pixel, a transition region is formed between the reflective region and the transmissive region. FIG. 1 is a schematic view of the basic structure of a pixel of a transflective LCD in the traditional technology. As shown in FIG. 1, a transition region 208 has an inclination angle of 45 degrees, and therefore when a cell gap difference between a reflective region 206 and a transmissive region 210 is 1-2 microns, the transition region 208 will also has a width of 1-2 microns. In the transition region 208, liquid crystal molecules will distort to cause a rotational dislocation, resulting in light leakage at the dark condition, thereby resulting in a decrease of contrast.

SUMMARY

According to a first aspect of the present invention, there is provided a transflective liquid crystal display panel. The transflective liquid crystal display panel comprises a plurality of pixels, each pixel including a reflective region, a transmissive region, and a transition region located between the reflective region and the transmissive region. A light shielding layer is provided in at least a part of the plurality of the pixels, and the light shielding layer is provided at a position corresponding to the transition region.

According to a second aspect of the present invention, there is provided a liquid crystal display including the transflective liquid crystal display panel described above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical solutions and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiment 1

Figure 1:
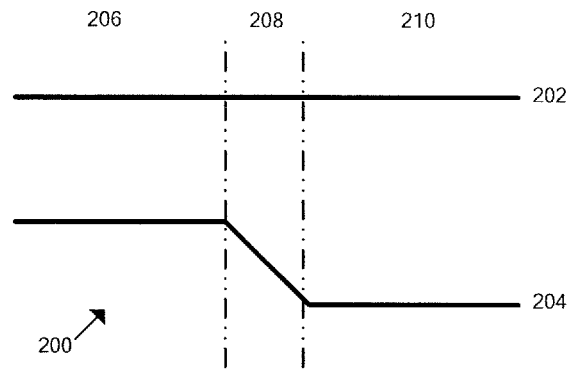
FIG. 1 is a schematic view of the basic structure of a pixel of a transflective LCD panel in the traditional technology.
Figure 2:
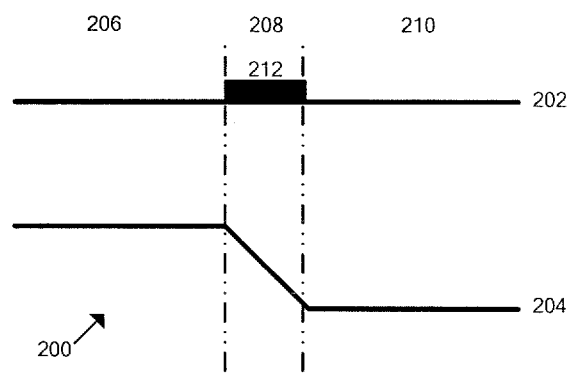
FIG. 2 is a schematic view of the basic structure of a pixel of a transflective liquid crystal display (LCD) panel according to a first embodiment of the present invention.

FIG. 2 is a schematic view of the basic structure of a pixel of a transflective liquid crystal display (LCD) panel according to a first embodiment of the present invention.

Referring to FIG. 2, the transflective LCD panel according to this embodiment includes a counter substrate 202, an array substrate 204 and a liquid crystal layer (not shown) located between the counter substrate 202 and the array substrate 204 and including liquid crystal molecules.

The counter substrate 202 is for example a color film substrate or a glass substrate. In a case where the counter substrate 202 is a color film substrate, the counter substrate 202 includes for example a black matrix (simply referred to as BM) and color pixel layers (such as red, green and blue (RGB) pixel layers) located between adjacent black matrix portions. Further, with regard to LCD panels of perpendicular electric field mode of a VA type, an MVA type, or the like, the counter substrate 202 may also include a common electrode thereon.

The array substrate 204 includes a plurality of gate lines and a plurality of data lines, which gate lines and data lines intersecting each another, thereby defining a plurality of pixels aligned in a matrix, each pixel including a thin film transistor as a switching element and a pixel electrode used to control the alignment of the liquid crystals. For example, of the thin film transistor of each pixel, a gate electrode is electrically connected with or integrally formed with a corresponding gate line, a source electrode is electrically connected with or integrally formed with a corresponding data line, and a drain is electrically connected with or integrally formed with a corresponding pixel electrode. Further, with regard to LCD panels of horizontal electric field mode of for example FFS type, IPS type, or the like, the array substrate 1 may also include a common electrode.

A plurality of pixels are formed on the counter substrate and the array substrate. One or more pixels constitute one pixel unit. For example, the three pixels of red, green, and blue (R, G, and B) constitute one pixel unit, that is, one pixel unit includes R pixel, G pixel, and B pixel. The images are displayed with pixel unit as a unit. For example, in FIG. 2, an explanation is made by using one of the R pixel, G pixel, and B pixel as an example.

As shown in FIG. 2, the pixel 200 has a reflective region 206, a transition region 208 and a transmissive region 210. The transition region 208 is located between the reflective region 206 and the transmissive region 210.

In this embodiment, in order to prevent the transition region 208 from leaking light, as shown in FIG. 2, a light shielding layer 212 is formed on the counter substrate 202 at a position corresponding to the transition region 208. The light shielding layer 212 may be formed of any opaque material, such as opaque metal or resin.

In a case where the counter substrate 202 is a color film substrate, the light shielding layer 212 is preferably made of the same material as the black matrix, thereby can be manufactured concurrently with the black matrix so as to simplify the process. The BM layer typically is made of a metal of chrome (Cr) in order to reduce surface reflection, or can be made of chromium oxide (CrOx) or resin. For example, the light shielding layer 212 and the black matrix BM can be manufactured concurrently by the following method. In one example, a printing method is employed, that is, the light shielding layer 212 can be formed as long as the printing pattern originally formed by the BM is changed. In another example, the entire region is coated with a BM material, and then unwanted region is etched off through exposing and etching, so as to form the black matrix BM and the light shielding layer 212 concurrently. In this solution, the black matrix BM and the light shielding layer 212 can be formed concurrently as long as the pattern of a mask plate used in exposing is changed.

Of course, the light shielding layer may be made of a material different from that of the black matrix, and/or may be manufactured separately from the black matrix.

In FIG. 2, the light shielding layer 212 is formed on the side of the counter substrate that is away from the liquid crystal layer, but the light shielding layer 212 can also be formed on the side of the counter substrate that is adjacent to the liquid crystal layer.

In this embodiment, since the light shielding layer 212 is formed on the counter substrate 202, light leakage due to irregularly aligned liquid crystals in the transition region 208 can be prevented.

Figure 3:
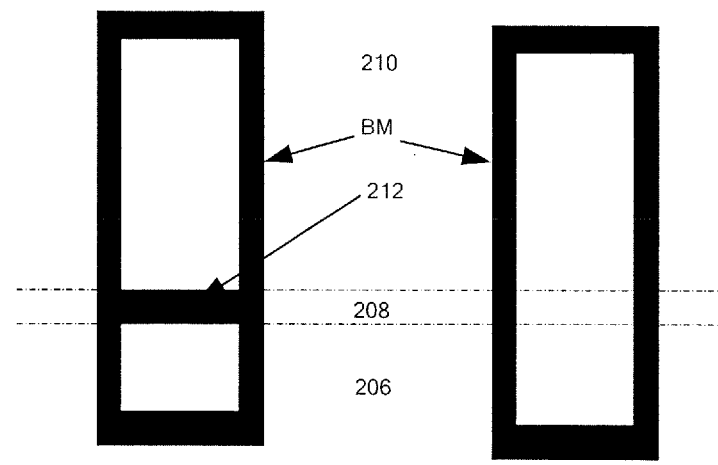
FIG. 3 is a comparative plan view of a pixel of the transflective LCD panel according to the first embodiment of the present invention and a pixel of the transflective LCD panel of the traditional technique.

FIG. 3 shows a comparative plan view of a pixel of the transflective LCD panel according to the first embodiment of the present invention and a pixel of the transflective LCD panel of the traditional technique. The pixel of the transflective LCD panel according to the first embodiment of the present invention is shown on the left side, while the pixel of the transflective LCD panel of the traditional technique is shown on the right side. As shown in FIG. 3, in the pixel of the transflective LCD panel, there is formed a black matrix BM and a light shielding layer 212.

Embodiment 2

Figure 4:
FIG. 4 is a schematic view of the basic structure of a pixel of a transflective liquid crystal display (LCD) panel according to a second embodiment of the present invention.

FIG. 4 is a schematic view of the basic structure of a pixel of a transflective liquid crystal display (LCD) panel according to a second embodiment of the present invention. The basic structure of the pixel 200 in the second embodiment is the same as that of the pixel 200 in the first embodiment except that: in the second embodiment, the light shielding layer is not formed on the counter substrate 202, but the light shielding layer 212 is formed on the array substrate 204 at a position corresponding to the transition region 208. For example, as shown in FIG. 4, the light shielding layer 212 is formed on the side of the array substrate 204 that is adjacent to the liquid crystal layer.

Further, although not shown, the light shielding layer 212 can also be formed on the side of the array substrate 204 that is opposite to the side adjacent to the liquid crystal layer, that is, formed at the bottom side of the transflective liquid crystal panel. For example, by coating a layer of a light shielding material under the transition region 208, the light shielding layer 212 is formed at the bottom side of the transflective liquid crystal panel.

The light shielding layer 212 may be formed of any opaque material, such as opaque metal or resin. Preferably, the light shielding layer 212 in this embodiment is made of a metallic material, and can be formed concurrently with the source electrode and the drain electrode of the TFT in the process of producing the TFT. Also, the light shielding layer 212 can also be formed concurrently with the gate electrode of the TFT.

In this embodiment, since the light shielding layer 212 is formed on the array substrate 204, light leakage due to irregularly aligned liquid crystals in the transition region 208 can be prevented.

It should be noted that, although the cases have been described in the above first and second embodiments in which the light shielding layer 212 is formed separately on the counter substrate 202 or on the array substrate 204, the light shielding layer 212 can also be formed concurrently on the counter substrate 202 and on the array substrate 204, so as to reduce light leakage.

Embodiment 3

Figure 5:
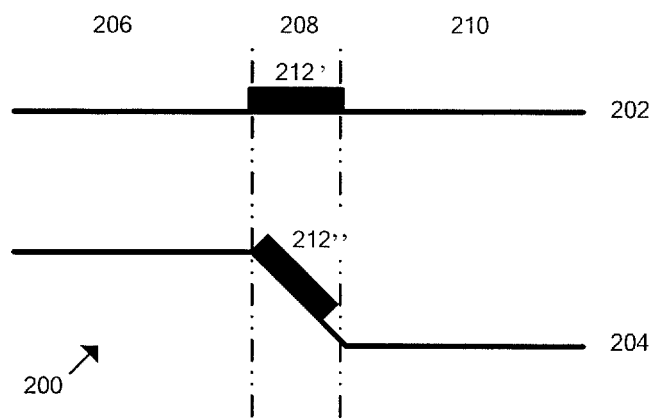
FIG. 5 is a schematic view of the basic structure of a pixel of a transflective liquid crystal display (LCD) panel according to a third embodiment of the present invention.

FIG. 5 is a schematic view of the basic structure of a pixel of a transflective liquid crystal display (LCD) panel according to a third embodiment of the present invention.

In this embodiment, a first electrode 212' is formed on the counter substrate 202 at a position corresponding to the transition region 208, and a second electrode 212" is formed on the array substrate 204 at a position corresponding to the transition region 208. Then an alternating voltage or a direct voltage of for example 3-10V is applied between the first electrode 212' and the second electrode 212". Therefore, an electric field is fainted in the transition region 208 so as to control the rotation of the liquid crystal molecules in the transition region 208, allowing the liquid crystal molecules at the transition region to form a liquid crystal light shielding layer, thereby preventing light leakage.

In this embodiment, the first electrode 212' and the second electrode 212" can be made of any conductive material. Further, in this embodiment, the first electrode 212' and the second electrode 212" can be light transmissive, or can be opaque.

In a case where the counter substrate 202 includes a common electrode, preferably the first electrode 212' and the common electrode are formed concurrently.

In a case where the array substrate 204 includes a common electrode, preferably the second electrode 212" and the common electrode are formed concurrently. Further, preferably the second electrode 212" and the source electrode and the drain electrode of the TFT on the array substrate 204 are formed concurrently. Also, the second electrode 212" can also be formed concurrently with the gate electrode of the TFT.

In the third embodiment, a voltage (AC or DC) of for example 3-10V is applied between the first electrode 212' and the second electrode 212", so as to form an electric field in the transition region 208, thereby controlling the rotation of the liquid crystal molecules in the transition region 208, allowing the transition region 208 to maintain a dark state, thereby preventing light leakage.

The transflective LCDs according to the above-described embodiments of the present invention are advantageous in reducing light leakage, and increasing the contrast, thereby improving the image quality of the liquid crystal panel.

It should be noted that, although several embodiments have been described separately in the above, these embodiments can be combined in differing ways. For example, the first embodiment and the third embodiment can be combined, wherein the BM is formed on the color film substrate concurrently with the forming of the light shielding layer 212, the first electrode 212' is formed on an inner surface of the color film substrate, the second electrode 212" is formed on an inner surface of the array substrate, and an alternating voltage or a direct voltage of 3-10V is applied between the first electrode 212' and the second electrode 212".

It should be noted that, in order to ensure the cell-assembling accuracy during a manufacturing process of the LCD panel, the size of the light shielding layer can be made greater than the size of the corresponding transition region.

It should be noted that, the above description is performed as to a single pixel. But the above-description can also be applied to a part or all of the pixels of a LCD panel.

In addition to the liquid crystal panel, the liquid crystal display of an embodiment of the present invention can further include a backlight module, a driving circuit and the like, the detailed description of which is omitted herein. This liquid crystal display can be used to for example cell phones, laptop PCs, GPSs, and the like.

The preferred embodiments of the invention described above are intended to illustrate but not limit the present invention. It should be understood by those skilled in the art that the present invention can be modified and varied in various ways, without departing from the spirit and scope of the present invention, any modification, variation, substitution in equivalent ways should be included in the protection scope of the invention.

The invention claimed is:

1. A transflective liquid crystal display panel comprising a plurality of pixels, each pixel including a reflective region, a transmissive region, and a transition region located between the reflective region and the transmissive region, wherein a light shielding layer is provided in at least a part of the plurality of the pixels, and the light shielding layer is provided at a position corresponding to the transition region, and the light shielding layer covers all of the transition region between the reflective region and the transmissive region, wherein the display panel further includes a counter substrate, an array substrate, and a liquid crystal layer located between the counter substrate and the array substrate and including liquid crystal molecules, and wherein a first electrode is provided at a position corresponding to the transition region on the counter substrate, a second electrode is provided at a position corresponding to the transition region on the array substrate, and a predetermined voltage is applied between the first electrode and the second electrode, so that liquid crystal molecule corresponding to the transition region and located between the first electrode and the second electrode form the light shielding layer.

2. The display panel according to claim 1, wherein the counter substrate includes a common electrode formed thereon, and the first electrode and the common electrode are formed concurrently.

3. The display panel according to claim 1, wherein the array substrate includes a common electrode formed thereon, and the second electrode and the common electrode are formed concurrently.

4. The display panel according to claim 1, wherein the array substrate includes a TFT formed thereon, and the second electrode are formed concurrently with a source electrode and a drain electrode of the TFT.

5. The display panel according to claim 1 wherein the predetermined voltage is an alternating voltage or a direct voltage of 3-10V.

6. The display panel according to claim 1, wherein the first electrode is light transmissive or opaque.

7. The display panel according to claim 1, wherein the second electrode is light transmissive or opaque.

8. The display panel according to claim 1, wherein a size of the light shielding layer is greater than a size of the transition region.

9. A liquid crystal display, including a transflective liquid crystal display panel according to claim 1.

* * * * *